United States Patent
Krishnan et al.

(10) Patent No.: US 10,793,115 B2
(45) Date of Patent: Oct. 6, 2020

(54) VEHICLE REAR WIPER SYSTEM

(71) Applicant: FORD GLOBAL TECHNOLOGIES, LLC, Dearborn, MI (US)

(72) Inventors: Venkatesh Krishnan, Canton, MI (US); Sunil Patil, Troy, MI (US); Mark E. Nichols, Saline, MI (US); Sami A. Alkharabsheh, Dearborn, MI (US); Raghuraman Surineedi, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/120,845

(22) Filed: Sep. 4, 2018

(65) Prior Publication Data

US 2020/0070782 A1 Mar. 5, 2020

(51) Int. Cl.
| | |
|---|---|
| *B60S 1/52* | (2006.01) |
| *B60S 1/54* | (2006.01) |
| *B60S 1/48* | (2006.01) |
| *B08B 3/02* | (2006.01) |
| *B08B 7/04* | (2006.01) |
| *B08B 5/02* | (2006.01) |
| *B60J 1/20* | (2006.01) |
| *B60J 1/18* | (2006.01) |

(52) U.S. Cl.
CPC ............... *B60S 1/52* (2013.01); *B08B 3/024* (2013.01); *B08B 5/02* (2013.01); *B08B 7/04* (2013.01); *B60S 1/481* (2013.01); *B60S 1/54* (2013.01); *B60J 1/18* (2013.01); *B60J 1/20* (2013.01)

(58) Field of Classification Search
None
See application file for complete search history.

(56) References Cited

U.S. PATENT DOCUMENTS

| | | | |
|---|---|---|---|
| 5,140,719 A | 8/1992 | Cowan | |
| 6,044,843 A * | 4/2000 | O'Neil | A61M 16/08 128/204.23 |
| 2004/0084069 A1 | 5/2004 | Woodard | |
| 2004/0238016 A1* | 12/2004 | Krause | B60S 3/04 134/57 R |

FOREIGN PATENT DOCUMENTS

| | | | | |
|---|---|---|---|---|
| CN | 105346516 A | 2/2016 | | |
| CN | 106184129 A | 12/2016 | | |
| JP | 2645011 B2 | 8/1997 | | |
| JP | 2009241819 A | 10/2009 | | |
| KR | 100262087 B1 | 10/2000 | | |
| WO | WO-2009010133 A1 * | 1/2009 | ........... | B60Q 1/0017 |
| WO | WO-2016177380 A1 * | 11/2016 | ................ | B60S 1/54 |

OTHER PUBLICATIONS

English Machine Translation of WO 2009-010133.*

* cited by examiner

*Primary Examiner* — Nicole Blan
(74) *Attorney, Agent, or Firm* — David Coppiellie; MacMillan, Sobanski & Todd, LLC

(57) ABSTRACT

A vehicle includes a rear window having hydrophobic portion, and a non-hydrophobic portion below the hydrophobic portion. A rear wiper system is mounted adjacent to a top of the rear window and includes a pivotable nozzle and a blower to direct an airstream through the nozzle onto the rear window.

12 Claims, 4 Drawing Sheets

VEHICLE REAR WIPER SYSTEM

BACKGROUND OF THE INVENTION

The present invention relates to a rear wiper system for a vehicle, and more particularly a rear wiper system that does not need a bladed wiper.

Many automotive vehicles, such as sport utility vehicles, cross over vehicles, and minivans, have rear window glass wipers that include a pivoting arm upon which is mounted a rubber blade pressed against the window, with the rubber blade sweeping across a portion of the window to clear rain, snow and debris from the window. These types of rear wipers may be desirable due to the fact that the rear window may attract a lot of dirt and debris in the low pressure zone formed immediately behind the vehicle when travelling in a forward direction. Also, due to the tendency for the rear window to collect the dirt and debris, a washer nozzle may be mounted adjacent to the rear window to wet the window prior to activating the rear wiper.

These conventional wipers with the rubber blades have some drawbacks, however. For example, the wipers may detract from the vehicle appearance. Due to the shape of the rear window they may clean a smaller area than is desired. The rubber blade, when worn out, may be relatively difficult to replace. Also, since the rubber blade rubbing against the rear window glass is abrasive in nature, the addition of hydrophobic coatings on the glass may not be desirable. The blade may freeze to the window in cold ice/snow weather. Moreover, the washer nozzle may not apply a liquid coating to the rear window very accurately at higher speeds due to the air flow and pressures behind the vehicle.

SUMMARY OF THE INVENTION

An embodiment contemplates a vehicle including a rear window having hydrophobic portion, and a non-hydrophobic portion below the hydrophobic portion; and a rear wiper system, mounted adjacent to a top of the rear window, including a pivotable nozzle and a blower configured to direct an airstream through the nozzle onto the rear window.

An embodiment contemplates a method of clearing a vehicle rear window comprising: activating a blower to direct air through a nozzle, located adjacent to a top of the rear window, onto the rear window, which has a hydrophobic portion and a non-hydrophobic portion below the hydrophobic portion; and pivoting the nozzle as the air is directed through the nozzle to push debris on the rear window from the hydrophobic portion to the non-hydrophobic portion.

An advantage of an embodiment is that a high speed pivotable air nozzle may clean the window similarly to a conventional rear wiper system but without the need for a wiper arm or blade. Moreover, a hydrophobic coating shapes the water flow to improve the clearing of the rear window, without a blade that would tend to wear the coating off of the window glass. And, a hydrophobic coating will tend to allow for less frost, ice and dirt accumulation, thus making rear window cleaning easier.

Another advantage of an embodiment is that the air blower speeds may be changed based on the needs for clearing rain or snow, and moreover may clear a larger area of the rear window than a blade on a conventional rear wiper system.

Another advantage of an embodiment is that the rear wiper system may be compact and light weight, and also improve the appearance of the rear window area by eliminating a wiper arm and blade.

DETAILED DESCRIPTION

Figure 1:
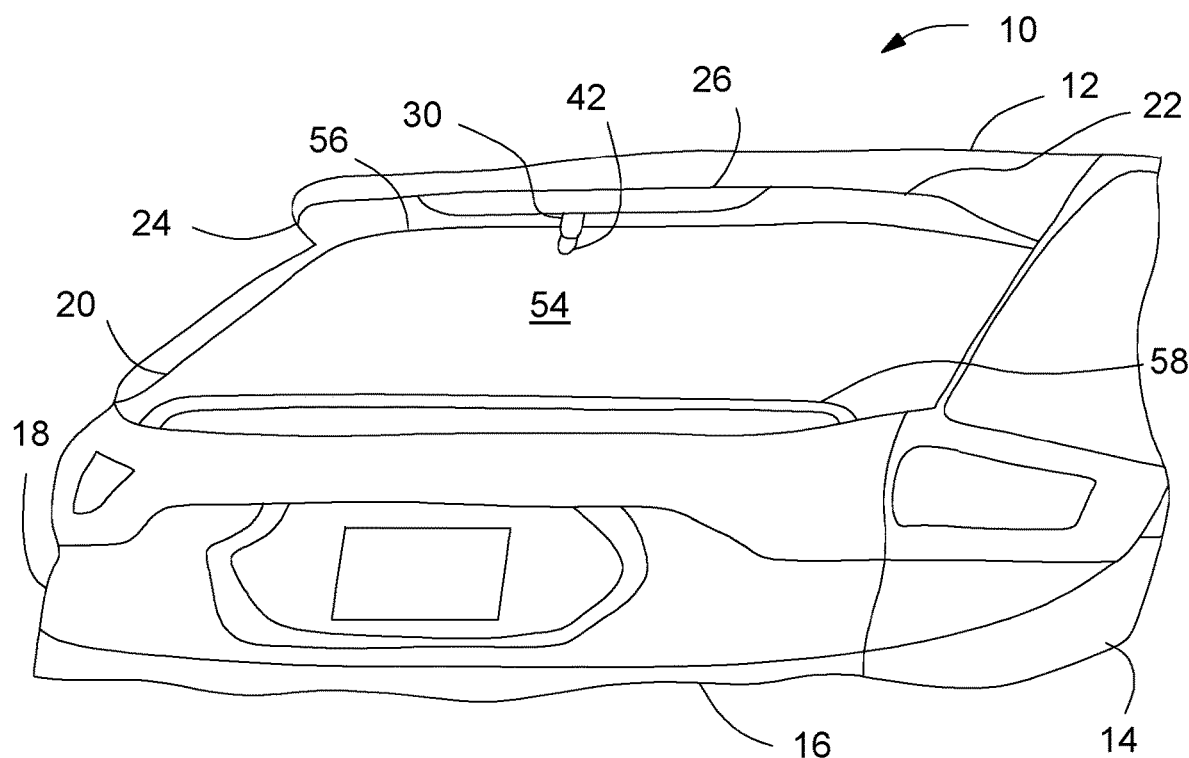
FIG. 1 is a schematic, rear perspective view of a portion of a vehicle.

FIGS. 1-7 illustrate a rear portion of a vehicle 10 having a roof 12 and sides 14, between which is mounted a rear hatch 16. The rear hatch 16 may include a lower portion 18, which may include for example a latch for opening the hatch 16 and a license plate holder, a rear window 20, and an upper portion 22 that may include a roof extension/spoiler 24 and a center high mount stop light (CHMSL) 26. This upper portion 22 may also include a rear wiper system 30.

Figure 5:
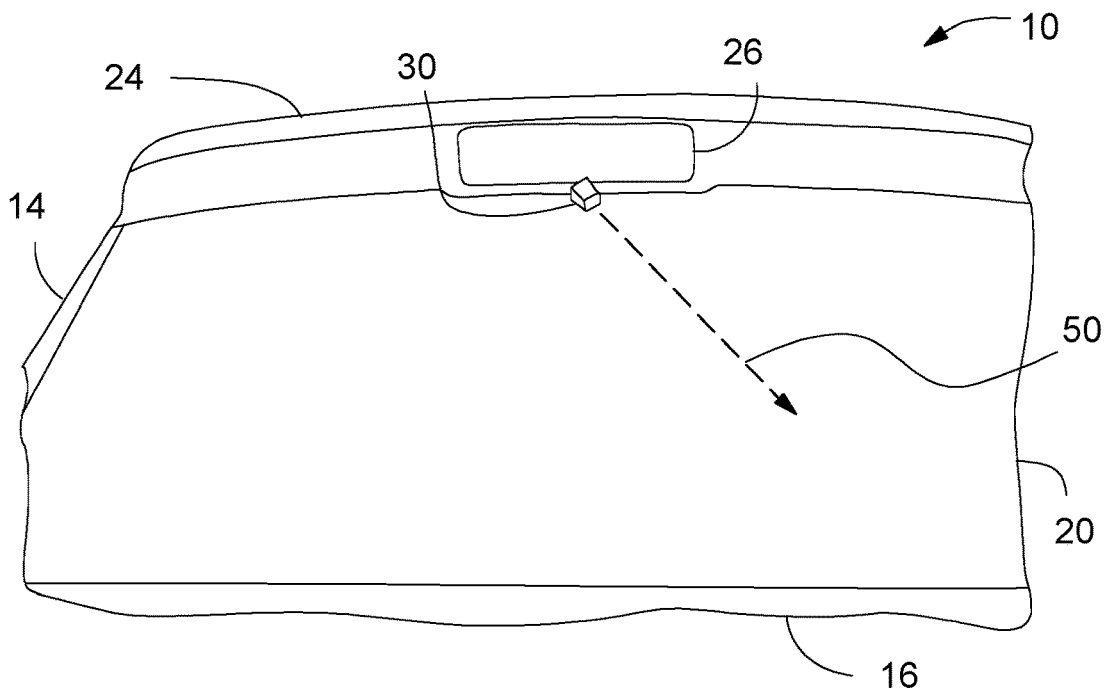
FIG. 5 is a schematic, rear perspective view of a portion of the vehicle with the nozzle directed toward the right side of the rear window.
Figure 6:
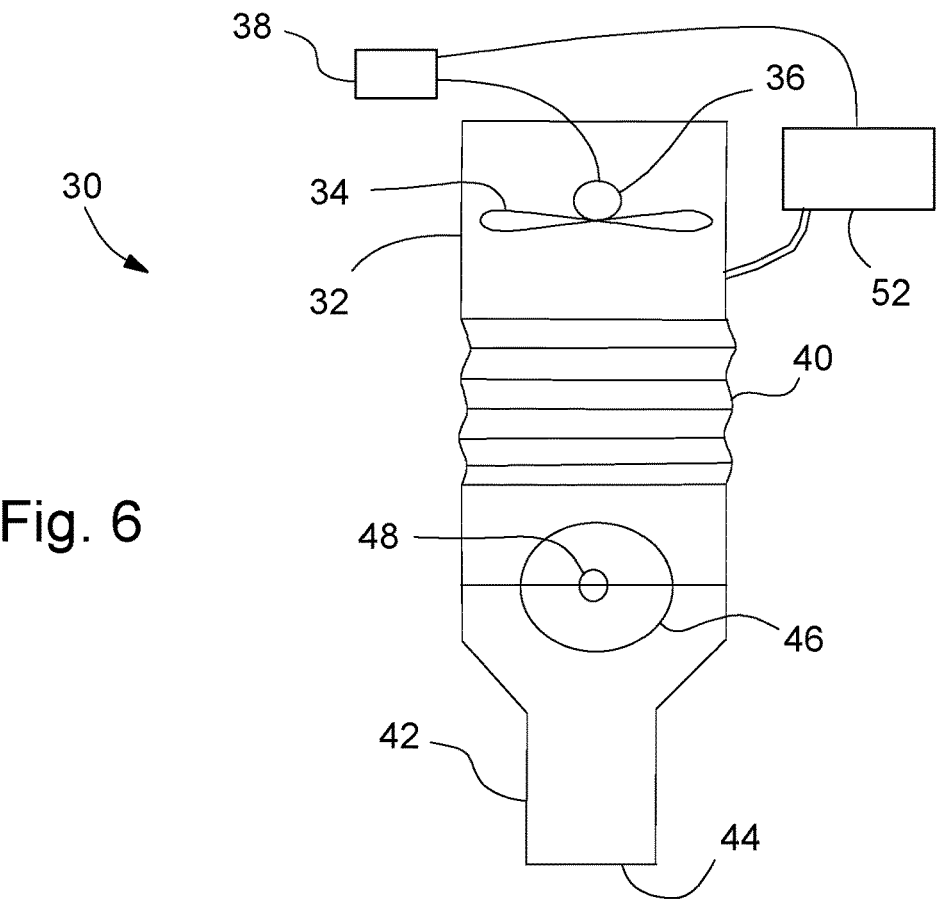
FIG. 6 is a schematic view of the wiper assembly.

The rear wiper system 30 may be mounted adjacent to or formed as part of the CHMSL 26 at the top center of the rear window 20. The system 30 may include a housing 32 containing a variable speed blower (fan) 34 driven by a motor 36, which may be controlled by a controller 38, such as for example a body controller 38 (the details of the rear wiper system 30 are best seen in FIG. 6). A flexible conduit (hose) 40 may be connected to the housing 32 for receiving air from the blower 34 and directing the air into a nozzle 42. The nozzle 42 may be sized and shaped to direct air from an outlet 44 forming an airstream 50 (shown by dashed arrows in FIGS. 2-5) having a width of approximately the width of a conventional rear wiper blade, if so desired. The nozzle 42 is mounted to a rotary actuator 46, which has a driver 48 for causing the rotary actuator 46 to pivot the nozzle 42 back and forth in order to direct the airstream 50 exiting the nozzle toward different parts of the rear window 20. As an alternative, if so desired, there may be more than one nozzle and blower assembly adjacent to the top of the window—this may increase the area of rear window that is cleaned, particularly for larger rear windows.

The nozzle 42 may be configured to create an airstream 50 that may have a width somewhat larger than or somewhat smaller than the width of a traditional wiper blade, depending upon the particular model of vehicle 10 that is employing this rear wiper system 30.

The variable speed blower 34 may be sized to assure that proper wiping (i.e., cleaning) of the rear window 20 occurs at various vehicle speeds. That is, for particular vehicles, especially vehicles with a relatively vertical rear window 20 (such as sport utility, cross overs and minivans), a low pressure zone is created immediately behind the vehicle 10 as the vehicle travels in a forward direction. For such vehicles, then, a relatively high speed airstream 50 is created by the blower 34 and nozzle 42 combination. The rear wiper system 30, then, preferably creates an airstream 50 with the air coming out of the nozzle 42 at a speed of at least about 50 meters/second (about 100 miles per hour). This is sufficient for moving the airstream 50 from top center to bottom of the rear window 20, thus allowing for rear window clearing even at relatively high vehicle speeds, such as about 80 miles per hour (130 kilometers per hour) or even somewhat higher. The variable speed of the blower 34 allows for slower speed airstreams 50 when the full high speed air is not needed—such conditions for higher or lower speed airstreams 50 may be programmed into the controller 38.

Figure 2:
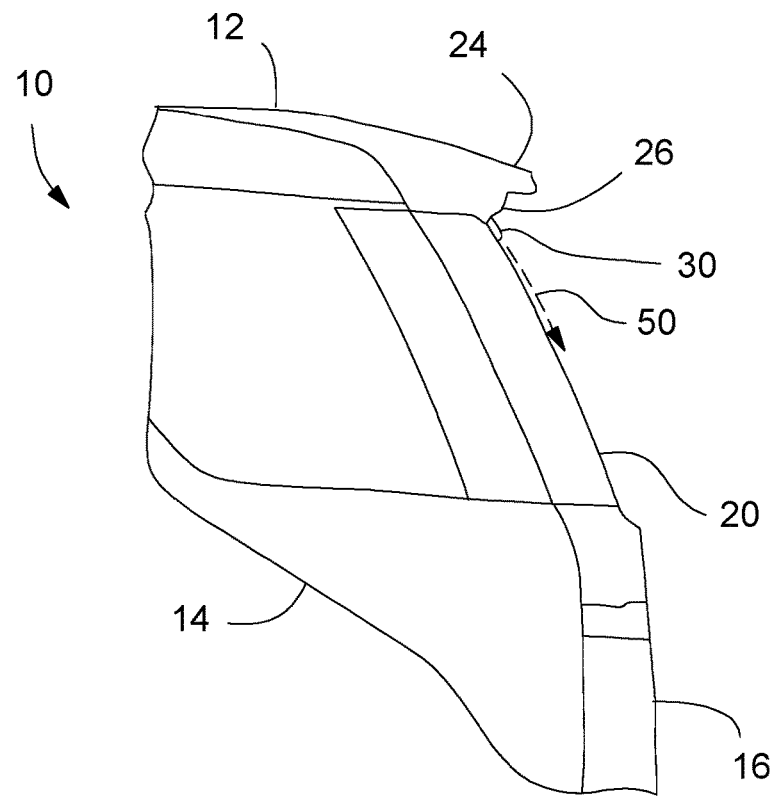
FIG. 2 is a schematic side view of a portion of the vehicle.
Figure 3:
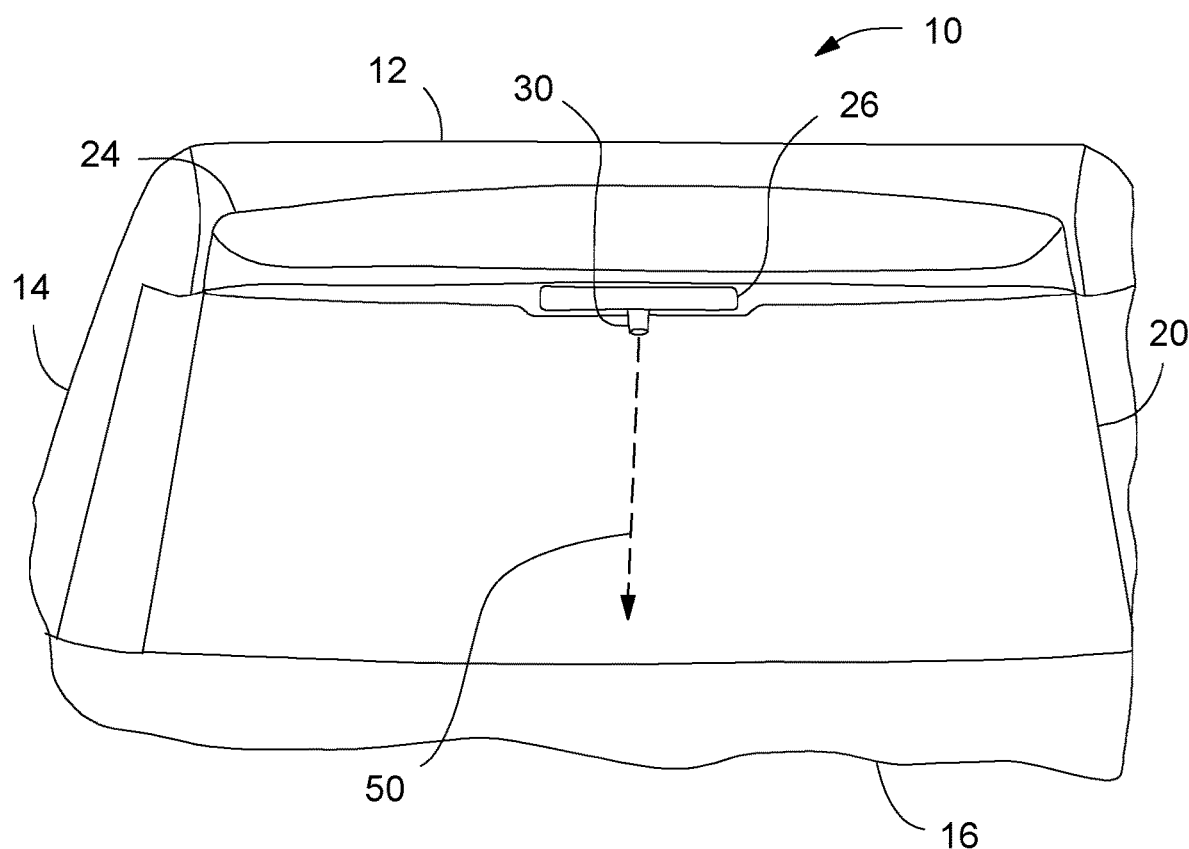
FIG. 3 is a schematic, rear perspective view of a portion of the vehicle with the nozzle directed directly downward on the rear window.
Figure 4:
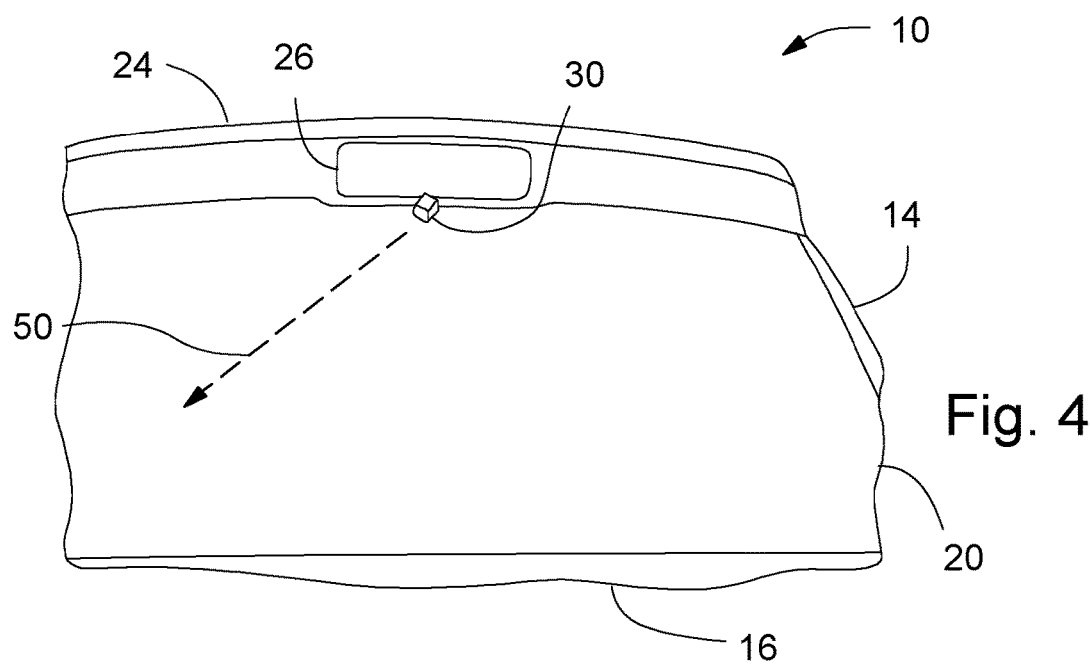
FIG. 4 is a schematic, rear perspective view of a portion of the vehicle with the nozzle directed toward the left side of the rear window.

As the blower 34 pushes the airstream 50 out of the nozzle 42, the rotary actuator 46 pivots the nozzle 42 back and forth across the rear window 20, thus clearing the window 20 in a manner similar to a conventional wiper blade. FIGS. 2 and 3 show the nozzle 42 in a middle position, pushing the airstream 50 down the middle of the rear window 20. FIG. 4 shows the nozzle 42 pivoted to the left and FIG. 5 shows the nozzle 42 pivoted to the right.

The rear wiper system 30 may also include a liquid supply 52 of cleaner to feed into the airstream 50 (shown in FIG. 6), which the controller 38 may selectively activate to provide the liquid cleaner 52 to the airstream 50 when desired for purposes of clearing the rear window 20.

Figure 7:
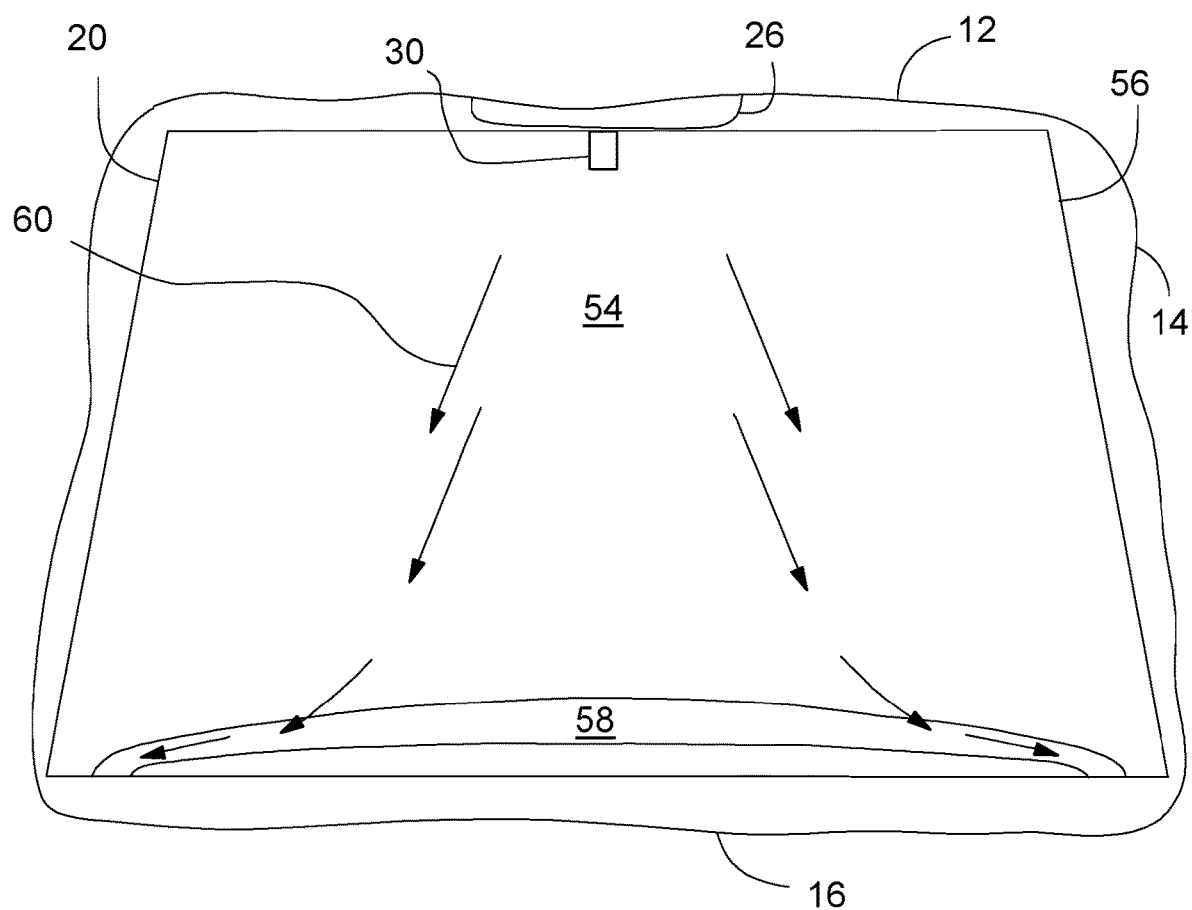
FIG. 7 is a schematic view of a rear portion of the vehicle, illustrating the water path along the rear window with hydrophobic coating applied to shape the water flow.

The rear window 20 includes a hydrophobic coating 54 over a portion 56 of the window 20 (noted in FIGS. 1 and 7), which portion 56 covers the entire top portion and down close to the bottom of the rear window 20. The hydrophobic coating 54 may be colorless and translucent and so is illustrated in FIGS. 1 and 7 for the purpose of describing the areas of application, but is not shown in the other figures as it is not generally visible to the human eye.

The rear window 20 also includes a portion 58 that does not have a hydrophobic coating (i.e., a non-hydrophobic portion). This non-hydrophobic portion 58 is adjacent to the bottom of the rear window 20, and extends generally horizontally, with a slight downward curvature in the middle and increasing curvature at each end toward vertical.

This configuration of window portions 56, 58 with and without hydrophobic coating, channels water being pushed down the rear window 20 by the airstream 50 to desired locations at the bottom of the rear window 20. FIG. 7 shows the paths of water 60 (solid arrows) flowing down the rear window 20 due to the airstream 50 and channeling due to the hydrophobic/non-hydrophobic portions 56, 58. One will note that the hydrophobic portion 56 improves the effectiveness of pushing the water 60 (and other debris) down the rear window 20, while the non-hydrophobic portion 58, adjacent to the bottom of the rear window 20, redirects the water flow 60, in effect channeling water to the corners of the rear window 20.

While certain embodiments of the present invention have been described in detail, those familiar with the art to which this invention relates will recognize various alternative designs and embodiments for practicing the invention as defined by the following claims.

The invention claimed is:

1. A vehicle comprising:
a rear window having a hydrophobic portion, and a non-hydrophobic portion below the hydrophobic portion;
wherein the non-hydrophobic portion is adjacent to a bottom of the rear window, and extends generally horizontally, with a downward curvature in a middle section and increasing downward curvature at each end toward vertical; and
a rear wiper system, mounted adjacent to a top of the rear window, including a pivotable nozzle and a blower configured to direct an airstream through the pivotable nozzle onto the rear window.

2. The vehicle of claim 1 wherein the rear wiper system further includes a liquid supply configured to selectively feed liquid into the airstream.

3. The vehicle of claim 1 wherein the rear wiper system is mounted to a center high mount stop light assembly.

4. The vehicle of claim 1 wherein the rear wiper system includes a rotary actuator operatively engaging the pivotable nozzle to pivot the nozzle back and forth across an arcuate path.

5. The vehicle of claim 4 further including a controller configured to activate the blower and the rotary actuator.

6. The vehicle of claim 1 wherein the rear wiper system further includes a liquid supply configured to selectively feed liquid into the airstream, and a controller configured to activate the blower and liquid supply.

7. A method of clearing a vehicle rear window comprising:
activating a blower to direct air though a nozzle, located adjacent to a top of the rear window, onto the rear window, which has a hydrophobic portion and a non-hydrophobic portion below the hydrophobic portion;
providing the non-hydrophobic portion adjacent to a bottom of the rear window, extending generally horizontally, with a downward curvature in a middle section and increasing downward curvature at each end toward vertical; and
pivoting the nozzle as the air is directed through the nozzle to push debris on the rear window from the hydrophobic portion to the non-hydrophobic portion.

8. The method of claim 7 further including entraining liquid into the air directed through the nozzle onto the rear window.

9. The method of claim 8 further including a controller controlling the dispensing of the liquid.

10. The method of claim 7 further including controlling a speed of the blower with a vehicle controller.

11. The method of claim 10 including the controller controlling the pivoting of the nozzle.

12. The method of claim 7 further including providing a center high mount stop light assembly and mounting the blower thereto.

* * * * *